US010412136B2

(12) United States Patent
Gonzalez De Langarica et al.

(10) Patent No.: US 10,412,136 B2
(45) Date of Patent: Sep. 10, 2019

(54) METHODS AND APPARATUS FOR MEDIA TRANSMISSION IN TELECOMMUNICATIONS NETWORKS

(75) Inventors: Ester Gonzalez De Langarica, Stockholm (SE); Andreas Lindqvist, Stockholm (SE); Srikanth Vavilapalli, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1255 days.

(21) Appl. No.: 14/404,986

(22) PCT Filed: Sep. 10, 2012

(86) PCT No.: PCT/EP2012/067629
§ 371 (c)(1),
(2), (4) Date: Jan. 5, 2015

(87) PCT Pub. No.: WO2013/182256
PCT Pub. Date: Dec. 12, 2013

(65) Prior Publication Data
US 2015/0172349 A1    Jun. 18, 2015

(30) Foreign Application Priority Data

Jun. 4, 2012  (IN) .......................... 1711/DEL/2012

(51) Int. Cl.
*H04L 29/06*    (2006.01)
(52) U.S. Cl.
CPC .......... *H04L 65/602* (2013.01); *H04L 65/103* (2013.01); *H04L 65/1016* (2013.01); *H04L 65/1043* (2013.01); *H04L 65/608* (2013.01)
(58) Field of Classification Search
CPC .... H04L 65/602; H04L 65/103; H04L 65/608
(Continued)

(56) References Cited

U.S. PATENT DOCUMENTS 9,319,263 B2 *   4/2016   Noldus ............... H04L 65/1016
2002/0120749 A1   8/2002   Widegren et al.
(Continued)

FOREIGN PATENT DOCUMENTS

WO    WO 02/37753 A2      5/2002
WO    WO 2012/065658 A1   5/2012
WO    WO 2013/127469 A1   9/2013

OTHER PUBLICATIONS

3GPP, Technical Specification, "3rd Generation Partnership Project; Technical Specification Group Core Network and Terminals; IP Multimedia Subsystem (IMS) Application Level Gateway (IMS-ALG)-IMS Access Gateway (IMS-AGW) Interface; Procedures descriptions (Release 11)", 3GPP TS 23.334 V11.0.0, 63pp. (Year: 2012).*

(Continued)

*Primary Examiner* — Minh Chau Nguyen
(74) *Attorney, Agent, or Firm* — Patent Portfolio Builders, PLLC

(57) ABSTRACT

There is provided a method of operating an IP Multimedia Subsystem Access Gateway (IMS-AGW) in order to support the transmission of media to and from an endpoint, using an IMS, wherein the endpoint implements an alternative media transport protocol other than Real-time Transport Protocol (RTP). The method comprises the IMS-AGW receiving instructions from an IMS Application Level Gateway (IMS-ALG) for an alternative media transport protocol connection with the endpoint and a RTP connection within the IMS, the instructions including more than one RTP payload type number and a dynamic binding of each of the more than one RTP payload type number to a statically defined codec identifier. The IMS-AGW stores the dynamic binding. Then, when translating between alternative media transport protocol packets and RTP packets, the IMS-AGW uses the stored (Continued)

binding to map between an RTP payload type number and a codec identifier used by the alternative media transport protocol.

14 Claims, 3 Drawing Sheets

(58) Field of Classification Search
USPC .................................................. 709/217–219
See application file for complete search history.

(56) References Cited

U.S. PATENT DOCUMENTS

| | | | | |
|---|---|---|---|---|
| 2008/0107108 | A1* | 5/2008 | Bouazizi | H04N 7/17318 370/389 |
| 2010/0017509 | A1* | 1/2010 | Frankkila | H04M 3/487 709/224 |
| 2011/0110364 | A1* | 5/2011 | Fried | G06Q 30/02 370/352 |
| 2011/0320192 | A1* | 12/2011 | Ozawa | H04M 7/125 704/201 |
| 2012/0023238 | A1 | 1/2012 | Bouthemy et al. | |
| 2012/0082158 | A1* | 4/2012 | Reddy | H04W 80/045 370/389 |
| 2012/0185600 | A1* | 7/2012 | Belling | H04L 45/00 709/227 |

OTHER PUBLICATIONS

International Search Report, PCT Application No. PCT/EP2012/067629, dated Feb. 12, 2014.
Written Opinion of the International Searching Authority, PCT Application No. PCT/EP2012/067629, dated Mar. 5, 2013.
3GPP, Technical Specification, "3rd Generation Partnership Project; Technical Specification Group Core Network and Terminals; IP multimedia call control protocol based on Session Initiation Protocol (SIP) and Session Description Protocol (SDP); Stage 3 (Release 11)", 3GPP TS 24.229 V11.3.0 (Mar. 2012), 728 pp.
3GPP, Technical Specification, "3rd Generation Partnership Project; Technical Specification Group Core Network and Terminals; IP Multimedia Subsystem (IMS) Application Level Gateway (IMS-ALG)—IMS Access Gateway (IMS-AGW) Interface; Procedures descriptions (Release 11)", 3GPP TS 23.334 V11.0.0 (Mar. 2012), 63 pp.
Handley et al., "SDP: Session Description Protocol", Network Working Group, Request for Comments: 4566, retrieved Nov. 14, 2014 from https://tools.ietf.org/html/rfc4566, 34 pp.
Parmer et al., "Adobe's Real Time Messaging Protocol", Adobe Systems Incorporated, Dec. 21, 2012, 52 pp.
Perkins, Chapter 4: "RTP Data Transfer Protocol", In: *RTP Audio and Video for the Internet*, Imprint: Addison-Wesley, Boston, MA, © 2003 Pearson Education, Inc. (Published: Jul. 18, 2003), pp. 67-94.
Rosenberg et al., An Offer/Answer Model with the Session Description Protocol (SDP), Network Working Group, Request for Comments: 3264, retrieved Nov. 14, 2014 from https://www.ietf.org/rfc/rfc3264.txt, 18 pp.
3GPP, Technical Specification, "3rd Generation Partnership Project; Technical Specification Group Services and System Aspects; Service requirements for the Internet Protocol (IP) Multimedia core network Subsystem (IMS); Stage 1 (Release 12)", 3GPP TS 22.228 V12.1.0 (Mar. 2012), 41 pp.
3GPP, Technical Specification, "3rd Generation Partnership Project; Technical Specification Group Services and System Aspects; IP Multimedia Subsystem (IMS); Stage 2 (Release 11)", 3GPP TS 23.228 V11.4.0 (Mar. 2012), 287 pp.
3GPP, Technical Specification, "3rd Generation Partnership Project; Technical Specification Group Core Network and Terminals; IP Multimedia (IM) Subsystem Cx and Dx Interfaces; Signalling flows and message contents (Release 11)", 3GPP TS 29.228 V11.3.0 (Mar. 2012), 72 pp.
3GPP, Technical Specification, "3rd Generation Partnership Project; Technical Specification Group Core Network and Terminals; Cx and Dx interfaces based on the Diameter protocol; Protocol details (Release 11)", 3GPP TS 29.229 V11.1.0 (Sep. 2012), 37 pp.
3GPP, Technical Specification, "3rd Generation Partnership Project; Technical Specification Group Core Network and Terminals; IP Multimedia (IM) Subsystem Sh Interface; Signalling flows and message contents (Release 11)", 3GPP TS 29.328 V11.3.0 (Mar. 2012), 54 pp.
3GPP, Technical Specification, "3rd Generation Partnership Project; Technical Specification Group Core Network and Terminals; Sh Interface based on the Diameter protocol; Protocol details (Release 11)", 3GPP TS 29.329 V11.2.0 (Mar. 2012), 22 pp.

* cited by examiner

METHODS AND APPARATUS FOR MEDIA TRANSMISSION IN TELECOMMUNICATIONS NETWORKS

CROSS REFERENCE TO RELATED APPLICATION

This application is a 35 U.S.C. § 371 national stage application of PCT International Application No. PCT/EP2012/067629, filed on 10 Sep. 2012, which itself claims priority to India Application No. 1711/DEL/2012, filed 4 Jun. 2012, the disclosures and contents of both of which are incorporated by reference herein in their entirety. The above-referenced PCT International Application was published in the English language as International Publication No. WO 2013/182256 A9 on 12 Dec. 2013.

TECHNICAL FIELD

The present invention relates to methods and apparatus for media transmission in telecommunications networks. More particularly, the invention relates to methods and apparatus for supporting the transmission of media to and from an endpoint of an IP Multimedia Subsystem session, wherein the endpoint implements an alternative media transport protocol other than Real-time Transport Protocol.

BACKGROUND

The IP Multimedia Subsystem (IMS) is the technology defined by the Third Generation Partnership Project (3GPP) to provide IP Multimedia services over telecommunication networks (see 3GPP TS 22.228, TS 23.228, TS 24.229, TS 29.228, TS 29.229, TS 29.328 and TS 29.329). IMS provides key features to enrich the end-user person-to-person communication experience through the integration and interaction of services. IMS allows new rich person-to-person (client-to-client) as well as person-to-content (client-to-server) communications over an IP-based network. The IMS is able to connect to both PSTN/ISDN (Public Switched Telephone Network/Integrated Services Digital Network) as well as the Internet.

FIG. 1 illustrates schematically the architecture for the IMS core network and its relationship to an IP-Connectivity Access Network (IP-CAN). In the IMS core network, Call/Session Control Functions (CSCFs) operate as SIP proxies, and interface with other entities such as Border Gateway Control Functions (BGCFs) and Media Resource Function Controllers (MRFCs) amongst others. The 3GPP architecture defines three types of CSCFs: a Proxy CSCF (P-CSCF) is the first point of contact within the IMS for a SIP terminal; a Serving CSCF (S-CSCF) provides services to the subscriber; and an Interrogating CSCF (I-CSCF) identifies the correct S-CSCF and forwards to that S-CSCF a request received from a SIP terminal via a P-CSCF.

The P-CSCF, as the initial SIP signalling contact point for subscribers, serves as a Back-to-Back User Agent (SIP B2BUA). The P-CSCF is responsible for forwarding SIP registration messages from the SIP terminal (e.g. the User Equipment (UE)), to the I-CSCF and subsequent call set-up requests and responses to the S-CSCF. The P-CSCF maintains the mapping between logical subscriber SIP URI address and physical UE IP address and a security association, for both authentication and confidentiality. When supporting IMS communication for a UE residing behind a NAT or when IP address translation is needed between the IP CAN and the IMS domain on the media path only, the P CSCF may include an IMS Application Level Gateway (IMS-ALG) function. The P-CSCF/IMS-ALG interacts with an IMS Access Gateway (IMS-AGW), over the Iq interface, for control of the boundary at the signalling and media layers (e.g. including pinhole firewall, Network Address and Port Translations (NAPT) lawful intercept and numerous other features).

The IMS-AGW controls the transport boundary at layers 3 and 4 between subscribers and the service provider's network. This function acts as a pinhole firewall and NAT device protecting the service provider's IMS network. It controls access by packet filtering on IP address/port and opening/closing gates (pinholes) into the network. It uses NAPT to hide the IP addresses/ports of the service elements in the IMS network. Other features include QoS packet marking, bandwidth and signalling rate policing, usage metering and QoS measurements for the media flows. The IMS-AGW sits at the boundary between an access network and a core network, at the core network side, and provides the functionality of a Core Border Gateway Function (C-BGF). It is also noted that the combination/integration of the P-CSCF and IMS-ALG at the signalling plane and the IMS-AGW at the media plane on the access side provides a Session Border Controller (SBC).

The Interconnect Border Control Function (IBCF) provides overall control of the boundary between different service provider networks. It provides security for the IMS network in terms of signaling information by implementing a Topology-Hiding Inter-network Gateway (THIG) subfunction, and IPv4-IPv6 inter-working by implementing an IMS ALG. The IMS ALG provides the necessary application function for SIP/SDP protocol stack in order to establish communication between IPv6 and IPv4 SIP applications. The IMS ALG receives an incoming SIP message, and changes the appropriate SIP/SDP parameters, translating the IPv6 address to IPv4 addresses and vice versa. The IBCF also invokes the Inter-Working Function (described below) when connecting non-SIP or non-IPv6 networks, and performs admission control and bandwidth allocation using local policies or via interface to PCRF elements. Lastly, the IBCF interacts with TrGW for control of the boundary at the transport layers including pinhole firewall, NAPT and numerous other features.

The Transition Gateway (TrGW) controls the transport boundary between service provider networks at layers 3 and 4 (e.g. with similar media functions as the IMS-AGW). The TrGW is located within the media path and controlled by the IBCF, provides network address/port translation and IPv4/IPv6 protocol translation, and supports proactive and reactive transcoding. The TrGW sits at the boundary between two core networks and provides the functionality of an Interconnection BGF (I-BGF). It is also noted that the combination/integration of the IBCF at the signalling plane and TrGW at the media plane on the interconnect side also provides a Session Border Controller (SBC).

In order to provide consumers with a comprehensive communication and interactive service experience on any web browser based device, telecommunications network operators want to be able to easily and quickly integrate and deploy services combining web and Internet applications with telecommunications network capabilities. It is therefore desired that telecommunication networks are able to support voice and video communications to and from web applications provided on User Equipment (UE). However, web browsers and web applications use protocols such as Hypertext Transfer Protocol (HTTP), Real-time Transport Protocol (RTP) in conjunction with the RTP Control Protocol (RTCP), and Real Time Messaging Protocol (RTMP) for delivering and controlling media. In contrast, the IMS core network makes use of the Session Initiation Protocol (SIP) to set up and control calls or sessions between user terminals (or user terminals and application servers), and media transmissions are carried using the Real-time Transport Protocol (RTP). The Session Description Protocol (SDP), carried by SIP signalling, is used to describe and negotiate the media components of the session (e.g. port numbers, protocols, codecs).

In order to transmit media to and from a web browser/application provided at a UE through an IMS, an IMS-AGW at the boundary between the access network and the IMS core network may be required to act as a media gateway/server with respect to the UE, and may therefore be required handle the conversion between RTP used for media transmission by the IMS and some other media transport protocol that is used by the web browser/application provided at the UE, such as RTMP. However, it has been recognised here that media transport protocol conversion/translation between RTP and some alternative media transport protocol may not be straightforward to implement.

In this regard, SDP used by the IMS to describe and negotiate the media components of a session makes use of dynamically allocated RTP payload type numbers to identify the codec/media format(s) that can be used for the media, and one of these dynamically allocated RTP payload type numbers must be included in the payload type (PT) header field of corresponding RTP packets to identify the codec/media format that has been used for media carried in the payload. Therefore, when translating between RTP media packets and alternative media transport protocol media packets, it may not be possible to simply translate between an RTP payload type number and a statically defined codec identifier used by the alternative media transport protocol.

This is particularly problematic when the negotiation of a session between two participants/end points establishes that more one common codec is supported by the participants, and at least one of the participants uses an alternative media transport protocol other than RTP. For example, when a first UE that implements RTMP wants to exchange media with second UE via the IMS, and both the first UE and the second UE support a number of common codecs, the first UE and the second UE will agree on more than one commonly supported codec during the negotiation of the session. Whilst the P-CSCF/IMS-ALG that serves the first UE will then communicate the negotiated codecs to the IMS-AGW in H.248 commands sent over the Iq interface, by including the negotiated SDP in a H.248 command, the IMS-AGW will not know which of these commonly supported codecs the UEs will actually select to use for the media. Consequently, if the IMS-AGW subsequently receives an RTP packet that includes the dynamically allocated RTP payload type number of the selected common codec, the IMS-AGW will not be able to determine the codec to which this dynamically allocated RTP payload type number relates, and will therefore be unable to determine the statically defined codec identifier that needs to be included in a corresponding alternative media transport protocol media packet. Similarly, if the IMS-AGW receives an alternative media transport protocol packet that includes a statically defined codec identifier of the selected common codec, the IMS-AGW could determine the codec to which this statically defined codec identifier relates, but will be unable to determine the dynamically allocated RTP payload type number that needs to be included in a corresponding RTP packet.

SUMMARY

It is therefore an object of the present invention to provide methods and apparatus for supporting the transmission of media to and from an endpoint of session using an IMS, wherein the endpoint implements an alternative media transport protocol other than the RTP implemented by the IMS.

According to a first aspect of the present invention, there is provided a method of operating an IP Multimedia Subsystem Access Gateway (IMS-AGW) in order to support the transmission of media to and from an endpoint, using an IMS, wherein the endpoint implements an alternative media transport protocol other than Real-time Transport Protocol (RTP). The method comprises the IMS-AGW receiving instructions from an IMS Application Level Gateway (IMS-ALG) for an alternative media transport protocol connection with the endpoint and a RTP connection within the IMS, the instructions including more than one RTP payload type number and a dynamic binding of each of the more than one RTP payload type number to a statically defined codec identifier. The IMS-AGW stores the dynamic binding of each of the more than one RTP payload type number to a statically defined codec identifier. Then, when translating between alternative media transport protocol packets carried by the alternative media transport protocol connection and the RTP packets carried by the RTP connection, the IMS-AGW uses the stored binding to map between an RTP payload type number and a codec identifier used by the alternative media transport protocol.

By way of example, the RTP connection may be between the IMS-AGW and any one of a further IMS-AGW, a IMS Transition Gateway (TrGW), and a Media Gateway (MGW). Also by way of example, the alternative media transport protocol may be the Real Time Messaging Protocol (RTMP).

The method may comprise, for an alternative media transport protocol packet received from the endpoint, translating the alternative media transport protocol packet to a RTP packet, including using the stored binding to map between a codec identifier included in the alternative media transport protocol packet and an RTP payload type number to be included in the RTP packet. The method may then further comprise obtaining a codec identifier from the alternative media transport protocol packet, using the stored binding to determine a RTP payload type number associated with the codec identified by the codec identifier, generating a RTP packet corresponding to the alternative media transport protocol packet, including the determined RTP payload type number in the RTP packet, and transmitting the RTP packet.

The method may comprise, for a RTP packet received from the IMS, translating the RTP packet to an alternative media transport protocol packet, including using the stored binding to map between an RTP payload type number included in the RTP packet and a codec identifier to be included in the alternative media transport protocol packet. The method may then further comprise obtaining a RTP payload type number from the RTP packet, using the stored binding to determine a codec identifier associated with the codec identified by the RTP payload type number, generating an alternative media transport protocol packet corresponding to the RTP packet, including the determined codec identifier in the alternative media transport protocol packet, and transmitting the alternative media transport protocol packet.

According to a second aspect of the present invention there is provided an apparatus configured to operate as an IP Multimedia Subsystem Access Gateway (IMS-AGW) and to support the transmission of media to and from an endpoint using an IMS, wherein the endpoint implements an alternative media transport protocol other than Real-time Transport Protocol (RTP). The apparatus comprises:

- a first receiver configured to receive instructions from an IMS Application Level Gateway (IMS-ALG) for an alternative media transport protocol connection with the UE and a RTP connection within the IMS, the instructions including more than one RTP payload type number and a dynamic binding of each of the more than one RTP payload type number to a statically defined codec identifier;
- a memory configured to store the dynamic binding of each of the more than one RTP payload type number to a statically defined codec identifier;
- a processor configured to translate between alternative media transport protocol packets carried by the alternative media transport protocol connection and RTP packets carried by the RTP connection, including using the stored binding to map between an RTP payload type number and a codec identifier used by the alternative media transport protocol.

The apparatus may further comprise a second receiver configured to receive an alternative media transport protocol packet from the endpoint. The processor may then be configured to translate the alternative media transport protocol packet to a RTP packet, including using the stored binding to map between a codec identifier included in the alternative media transport protocol packet and an RTP payload type number to be included in the RTP packet. The processor may be further configured to obtain a statically defined codec identifier from the alternative media transport protocol packet, to use the stored binding to determine a RTP payload type number dynamically allocated to the codec identified by the statically defined codec identifier, to generate a RTP packet corresponding to the alternative media transport protocol packet, and to include the determined RTP payload type number in the RTP packet. The apparatus may also further comprise a transmitter configured to transmit the RTP packet.

The apparatus may further comprise a second receiver configured to receive a RTP packet received from the IMS. The processor may then be configured to translate the RTP packet to an alternative media transport protocol packet, including using the stored binding to map between an RTP payload type number included in the RTP packet and a codec identifier to be included in the alternative media transport protocol packet. The processor may be further configured to obtain a RTP payload type number from the RTP packet, using the stored binding to determine a codec identifier associated with the codec identified by the RTP payload type number, generating an alternative media transport protocol packet corresponding to the RTP packet, and include the determined codec identifier in the alternative media transport protocol packet. The apparatus may also further comprise a transmitter configured to transmit the alternative media transport protocol packet.

By way of example, the RTP connection may be between the IMS-AGW and any one of a further IMS-AGW, a IMS Transition Gateway (TrGW), and a Media Gateway (MGW).

Also by way of example, the alternative media transport protocol may be the Real Time Messaging Protocol (RTMP).

According to a third aspect of the present invention there is provided a computer program comprising computer program code means adapted to perform all the steps of the method of the first aspect when said program is run on a computer.

According to a fourth aspect of the present invention there is provided a computer program according to the third aspect embodied on a computer readable medium.

DETAILED DESCRIPTION

Figure 1:
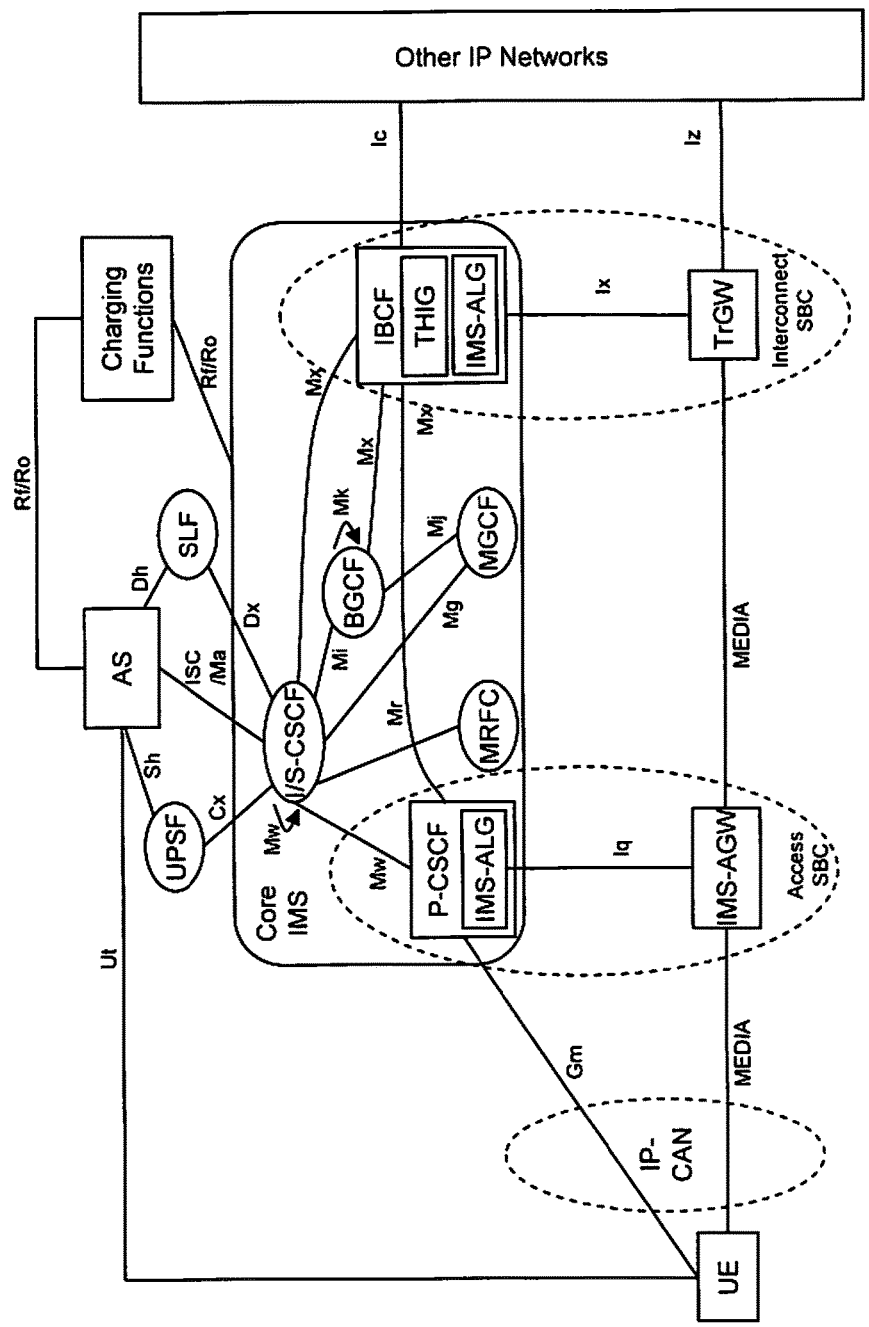
FIG. 1 illustrates schematically the architecture for the IMS core network and its relationship to an IP-CAN.

There will now be described methods and apparatus for supporting the transmission of media to and from an endpoint/participant of session using an IMS, wherein the endpoint/participant implements an alternative media transport protocol other than the RTP implemented by the IMS. An end point is typically located in a UE, but can also be located in a network entity.

It is proposed herein that, when an IMS-AGW receives instructions, from an IMS-ALG, for an alternative media transport protocol connection with an endpoint/participant in a session and an RTP connection within the IMS, and these instructions include more than one RTP payload type number and a dynamic binding of each of the more than one RTP payload type number to a statically defined codec identifier, the IMS-AGW is configured to store the dynamic binding of each of the more than one RTP payload type number to a statically defined codec identifier. The IMS-AGW is then configured to use the stored binding, when translating between alternative media transport protocol packets carried by the alternative media transport protocol connection and the RTP packets carried by the RTP connection, to map between an RTP payload type number and a codec identifier used by the alternative media transport protocol. The IMS-AGW can thereby ensure that, when the participants in a media session support more than one common codec and at least one of the participants doesn't use RTP for media transport, the translated media packets will correctly identify which of the commonly supported codecs has been selected for the media.

In order to be able to implement the above proposed method, the IMS-AGW is configured to accept instructions for a media session from an IMS-ALG (i.e. H.248 command messages) that include a dynamic binding between a dynamically allocated RTP payload type number and a statically defined identifier of each of the more than one common codecs that could be used for the media session, and to store the dynamic binding. The IMS-AGW is further configured to process media packets received within the media session to obtain one of a RTP payload type number and a codec identifier of the common codec that has been selected for the media, to use the stored dynamic binding to map the obtained RTP payload type number or codec identifier to the other of an RTP payload type number and a codec identifier, to translate the received media packets from either RTP or the alternative media transport protocol to the other of RTP or the alternative media transport protocol, and to include the other of RTP payload type number and a codec identifier in the translated media packets.

By providing that the IMS-AGW is configured to both store the dynamic bindings received from the IMS-ALG (i.e. during the codec negotiation) and to use the stored dynamic bindings to map between a dynamically allocated RTP payload type number and a codec identifier used by an alternative media transport protocol, the methods and apparatus described herein enable the IMS-AGW to translate between RTP and the alternative media transport protocol, even when the negotiation of the media session has established that more one common codec is supported by the participants.

Figure 2:
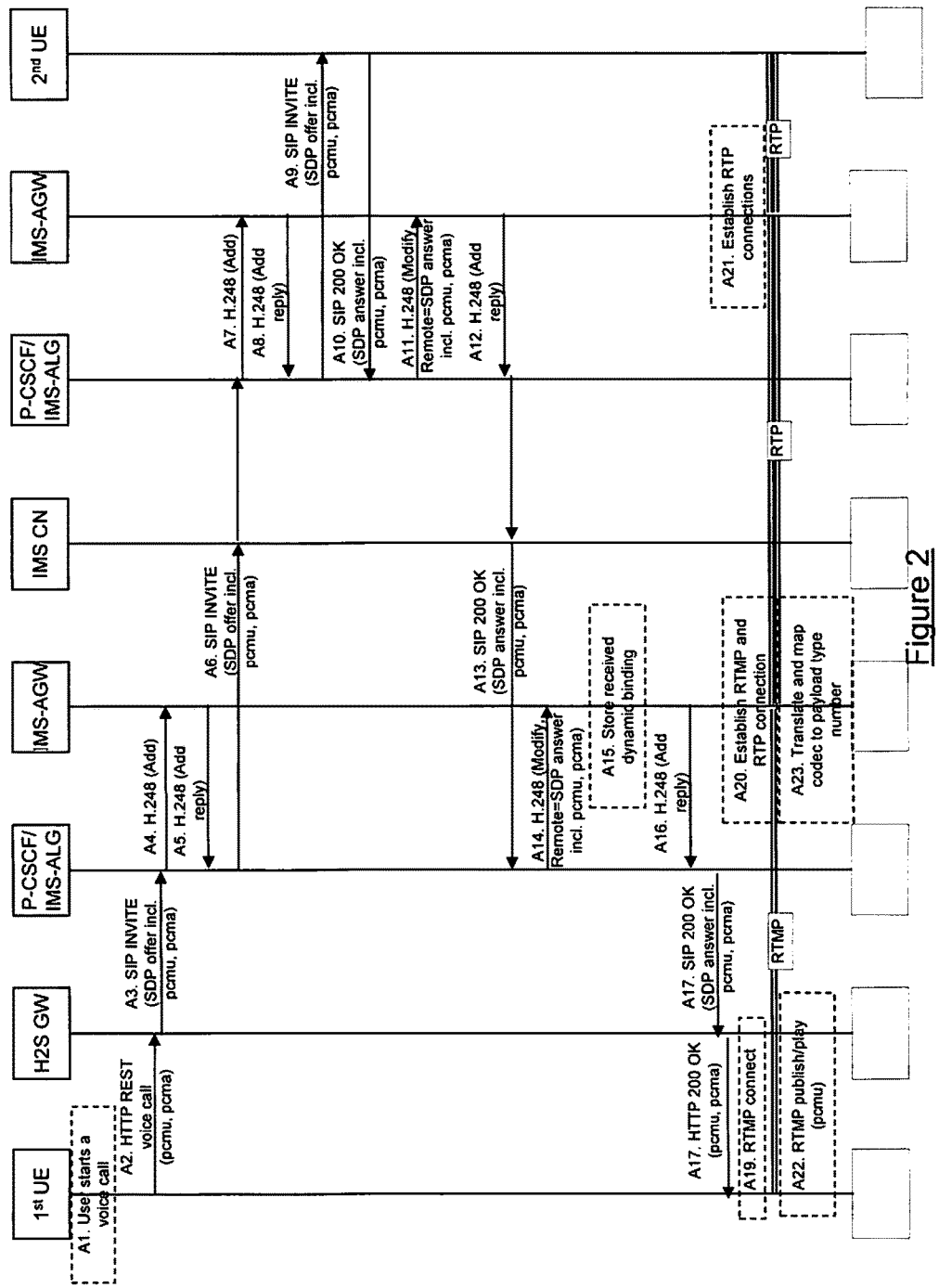
FIG. 2 is a flow diagram illustrating an example of the process of a first UE initiating a media session with a second UE via the IMS according to a method described herein.

FIG. 2 is a flow diagram illustrating an example of the method outlined above. In this example, the user of a first UE (i.e. a session endpoint/participant) wants to use a web browser on the first UE to establish a voice call to a second UE via the IMS. The web browser on the first UE implements RTMP as the media transport protocol whilst the IMS implements RTP as the media transport protocol. As such, both the first UE and the second UE support a number of common codes for audio and video. In particular, for audio, both RTP and RTMP support G.711 using either of Pulse Code Modulation μ-law (PCMU) and Pulse Code Modulation A-law (PCMA). Similarly, for video, both RTP and RTMP support H.264 using either of the Constrained Baseline Profile (CBP) and Baseline Profile (BP). In order to allow the web browser on the first UE to setup and control the session within the IMS, the web browser uses HTTP-REST to interact with a functional entity provided within the access network and referred to herein as a HTTP-to-SIP Gateway (H2S GW). The H2S GW translates between HTTP-REST and SIP, and acts as an IMS terminal emulator for control signalling, as described further in PCT/EP2012/053679.

The steps performed are as follows:

A1. The user of the first UE starts a voice call using the web browser on the first UE. For example, the user may press on a button within a web page presented on the Graphical User Interface (GUI) of the first UE.

A2. The web browser/HTTP client of the first UE generates a corresponding HTTP-REST message indicating that it wants to establish a voice call. This HTTP-REST message includes the codecs that the first UE supports. In this example, the first UE supports the PCMU and PCMA audio codecs. The HTTP-REST message can also include other parameters/attributes for the call, such as the media transport protocol to be used.

A3. The HTTP-REST message is received by a H2S GW in the access network used by the first UE. The H2S GW translates the HTTP-REST message to an equivalent SIP INVITE message including an SDP offer and transmits the SIP INVITE message towards the IMS. For example, the SDP body of the SIP INVITE could take the format:

---
m=audio 9 TCP/RTMP 98 99
a=rtpmap:98 pcmu/8000
a=rtpmap:99 pcma/8000
---

As the first UE has indicated that it wants to establish a voice call using RTMP and that two different codecs are supported, the media description line (m=) of the SDP body of the SIP INVITE message specifies that the media type is audio, that RTMP is to be used to transport the media, and includes two payload type numbers. The SDP body therefore also includes an rtpmap attribute line (a=) for each payload type number that dynamically binds the payload type number to an encoding name that identifies the codec/media format. In this example, the media line includes the payload type numbers 98 and 99, the first rtpmap attribute line therefore binds the payload type number 98 to the PCMU codec/media format, and the second rtpmap attribute line binds the payload type number 99 to the PCMA codec/media format.

A4. The SIP INVITE message is received by an P-CSCF/IMS-ALG on the originating side of the IMS that serves the first UE. The P-CSCF/IMS-ALG determines that the SIP INVITE message has been received from the H2S GW and that the SDP within the SIP INVITE specifies RTMP as the media transport protocol. The P-CSCF/IMS-ALG thereby determines that the IMS-AGW should be configured to perform RTMP to RTP conversion and sends a H.248 Add command to the IMS-AGW on the originating side of the IMS core network. The H.248 Add command instructs the IMS-AGW that a RTMP termination/connection is required to the first UE and that an RTP termination/connection is required with an IMS media gateway that serves the second UE.

A5. Upon receipt of the H.248 Add command, the originating IMS-AGW creates a H.248 context and reserves resources for a RTP connection in the IMS and for a RTMP connection to the UE. The originating IMS-AGW sends a reply to the H.248 Add command.

A6. As the originating P-CSCF/IMS-ALG has determined that the SDP within the received SIP INVITE specifies RTMP, the originating P-CSCF/IMS-ALG is aware that this media transport protocol cannot be used by the IMS, and therefore modifies the SDP to specify that RTP will be used as the media transport protocol within the IMS (i.e. after conversion by the IMS-AGW). For example, the modified SDP body of the SIP INVITE could take the format:

---
m=audio 10000 RTP AVP 98 99
a=rtpmap:98 pcmu/8000
a=rtpmap:99 pcma/8000
---

The media description line of the modified SDP body of the SIP INVITE message now specifies that the media type is audio, that RTP is to be used to transport the media, and includes the two payload type numbers from the original SDP. The modified SDP body therefore also includes the rtpmap attribute lines from the original SDP that dynamically binds each payload type number to an encoding name that identifies the codec/media format. The P-CSCF/IMS-ALG sends the SIP INVITE (including the modified SDP body) through the IMS core network to a P-CSCF/IMS-ALG on the terminating side that serves the called/second UE.

A7. The SIP INVITE message is received by the terminating P-CSCF/IMS-ALG, which therefore sends a H.248 Add command to an IMS-AGW on the terminating side of the IMS core network. The H.248 Add command instructs the terminating IMS-AGW that a RTP termination/connection is required to the second UE and that an RTP termination/connection is required with the originating IMS-AGW.

A8. Upon receipt of the H.248 Add command, the terminating IMS-AGW creates a H.248 context and reserves resources for a RTP connection in the IMS and for a RTP connection to the UE. The terminating IMS-AGW sends a reply to the H.248 Add command.

A9. The terminating P-CSCF/IMS-ALG sends the SIP INVITE (including the modified SDP body) towards the second UE.

A10. The second UE receives the SIP INVITE including the SDP offer defined by the modified SDP body. The second UE generates a SIP 200 OK including an SDP body that defines the SDP answer. In this case, the second UE supports all of the codecs included in the SDP offer, and therefore generates an SDP answer that corresponds to the SDP offer. For example, the SDP body of the SIP 200 OK could take the format:

```
m=audio 10000 RTP/AVP 98 99
a=rtpmap:98 pcmu/8000
a=rtpmap:99 pcma/8000
```

As the second UE implements RTP as the media transport protocol it will also support both PCMU and PCMA (i.e. both the first UE and the second UE support both PCMU and PCMA as common codecs). The media description line of the SDP body of the SIP 200 OK message therefore specifies that the media type is audio, that RTP is to be used to transport the media, and includes two payload type numbers. The SDP body therefore also includes an rtpmap attribute line for each payload type number that dynamically binds the payload type number to an encoding name that identifies the codec/media format. In this example, the media line includes the payload type numbers 98 and 99, the first rtpmap attribute line therefore binds the payload type number 98 to the PCMU codec/media format, and the second rtpmap attribute line binds the payload type number 99 to the PCMA codec/media format.

A11. The SIP 200 OK message is received by the terminating P-CSCF/IMS-ALG. The terminating P-CSCF/IMS-ALG then sends a H.248 Modify command to the terminating IMS-AGW and includes the SDP body from the SIP 200 OK message in the Remote descriptor/parameter of the RTP termination. For example, the H.248 Modify command could take the format:

```
MEGACO/3 [192.168.17.1]:3948
Transaction = 402 {
    Context = 12345 {
        Priority = 5,
        Modify = ip/1/2/12346 {
            Media {
                Stream = 1 {
                    LocalControl {
                        Mode = SendReceive,
                    },
                    Remote {
                        v=0
                        m=audio 10000 RTP/AVP 98 99
                        a=rtpmap:98 pcmu/8000
                        a=rtpmap:99 pcma/8000
                        b=AS:90
                    }
                }
            },
        }
```
```
        },
    }
```

A12. The terminating IMS-AGW sends a reply to the H.248 Modify command.

A13. The terminating P-CSCF/IMS-ALG sends the SIP 200 OK message through the IMS core network to the originating P-CSCF/IMS-ALG.

A14. The SIP 200 OK message is received by the originating P-CSCF/IMS-ALG. The originating P-CSCF/IMS-ALG then sends a H.248 Modify command to the originating IMS-AGW and includes the SDP body from the SIP 200 OK message in the Remote descriptor/parameter of the RTMP termination. For example, the H.248 Modify command could take the format:

```
MEGACO/3 [192.168.17.1]:3948
Transaction = 402 {
    Context = 12345 {
        Priority = 5,
        Modify = ip/1/2/12346 {
            Media {
                Stream = 1 {
                    LocalControl {
                        Mode = SendReceive,
                    },
                    Remote {
                        v=0
                        m=audio 10000 RTP/AVP 98 99
                        a=rtpmap:98 pcmu/8000
                        a=rtpmap:99 pcma/8000
                        b=AS:90
                    }
                }
            },
        }
}
```

A15. The IMS-AGW receives the H.248 Modify command from the P-CSCF/IMS-ALG. The IMS-AGW processes H.248 Modify command to obtain the dynamic binding information from the SDP, and stores the dynamic binding information (i.e. the binding between each RTP payload type number and the statically defined encoding name of corresponding codec).

A16. The originating IMS-AGW sends a reply to the H.248 Modify command.

A17. As the originating P-CSCF/IMS-ALG is aware that the SIP INVITE to which the SIP 200 OK relates was received from a H2S GW, and that the SDP within the SIP INVITE specified RTMP, the originating P-CSCF/IMS-ALG is aware that the first UE does not support RTP as specified in the SDP of the SIP 200 OK. The P-CSCF/IMS-ALG therefore modifies the SDP answer to specify that RTMP will be used as the media transport protocol to the first UE (i.e. after conversion by the IMS-AGW). For example, the modified SDP body of the SIP INVITE could take the format:

```
m=audio 9 TCP/RTMP 98 99
a=rtpmap:98 pcmu/8000
a=rtpmap:99 pcma/8000
```

The originating P-CSCF/IMS-ALG sends the SIP 200 OK message including the modified SDP to the H2S GW.

A18. The SIP 200 OK message is received by the H2S GW. The H2S GW translates the SIP 200 OK message to an equivalent HTTP-REST message indicating that the called user has accepted the call and that the second UE also supports the PCMU and PCMA audio codecs. The originating H2S GW transmits the HTTP-REST message to the first UE.

A19. The first UE receives the HTTP-REST message indicating that the called user has accepted the call. The web browser of the first UE then generates an RTMP connect command message, and sends the RTMP connect command message to the originating IMS-AGW.

A20. The originating IMS-AGW receives RTMP connect command message and establishes a RTMP connection between the originating IMS-AGW and the first UE, and an RTP connection between the originating IMS-AGW and the terminating IMS-AGW through the IMS.

A21. As the originating IMS-AGW established an RTP connection with the terminating IMS-AGW, the terminating IMS-AGW establishes the associated RTP connection to the second UE.

A22. The first UE selects which of the commonly supported codecs that it intends to use for the media, and sends an RTMP publish/play packet/message to the IMS-AGW that includes an identifier for the selected codec within the RTMP publish/play message. As the first UE is implementing the RTMP media transport protocol, the codec identifier included within the RTMP message is associated with the selected codec in accordance with the RTMP standards. In this example, the first UE selects the PCMU audio codec and therefore includes statically defined codec identifier "8" within the "SoundFormat" field in the F4V header of RTMP message, as the number 8 stands for "G.711 mU-law logarithmic PCM" (i.e. PMCU).

A23. The RTMP publish/play packet/message is received by the originating IMS-AGW. The originating IMS-AGW processes the received RTMP publish/play message and identifies the codec identifier. The originating IMS-AGW maps the codec identifier received in the RTMP message to the corresponding encoding name used for the codec by RTP. The originating IMS-AGW then uses the stored dynamic bindings to determine the dynamically assigned payload type number of the selected common codec, generates a corresponding RTP packet/message and includes the payload type number associated with the selected common codec in the RTP packet. The originating IMS-AGW then sends the RTP message to the terminating IMS-AGW (i.e. for transmission to the second UE).

Whilst the example illustrated in FIG. 2 describes a scenario in which media is transmitted from the first UE (i.e. endpoint/participant) using RTMP (i.e. that is not supported by the IMS), the methods and apparatus are equally applicable to a scenario in which the media is transmitted to the first UE. In this scenario, the IMS-AGW serving the first UE (i.e. the terminating IMS-AGW) will again store the dynamic bindings of the more than one common codecs received from the P-CSCF/IMS-ALG during the media negotiation. However, the terminating IMS-AGW would subsequently receive an RTP packet from an originating IMS-AGW that includes a payload type number of the selected common codec in the PT header field, and would then use the stored bindings to determine the RTP encoding name of the selected common codec before mapping the determined RTP encoding name to a codec identifier that is associated with the selected common codec by RTMP. The terminating IMS-AGW would then send an RTMP packet to the first UE including the media from the RTP message and the determined identifier of the selected common codec. In addition, in a scenario which the media is transmitted to the first UE, the P-CSCF/IMS-ALG serving the first UE would modify the SDP within a SIP INVITE message sent to the first UE from RTMP to RTP, and the SDP within a corresponding SIP 200 OK message sent from the first UE from RTP to RTMP.

Furthermore, whilst the example illustrated in FIG. 2 relates to a scenario in which media is transmitted between a first UE (i.e. endpoint/participant) and a second UE (i.e. endpoint/participant) that are connected to the same IP-CAN, such that the media is transmitted between two IMS-AGW, the methods and apparatus are equally applicable to a scenario in which the media is transmitted between endpoints/participants that are connected to different IP-CANs, such that the media is transmitted between an IMS-AGW and a TrGW, and between an endpoint/participant connected to an IP-CAN and an endpoint/participant connected to a circuit switched access network, such that media is transmitted between an IMS-AGW and an IMS Media Gateway (IMS-MGW).

Figure 3:
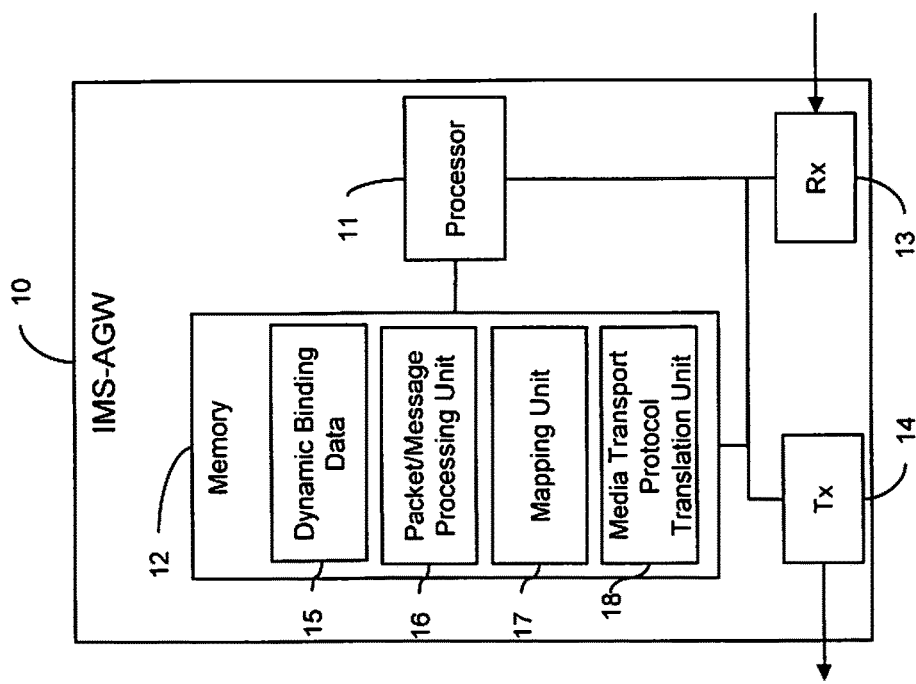
FIG. 3 illustrates schematically an example of an IMS-AGW suitable for implementing the methods described herein.

FIG. 3 illustrates schematically an example of an IMS-AGW 10 for implementing the transmission media to or from an endpoint/participant using an IMS in accordance with the methods described above. The IMS-AGW 10 can be implemented as a combination of computer hardware and software. The IMS-AGW 10 comprises a processor 11, a memory 12, a receiver 13 and a transmitter 14. The memory 12 stores the various programs/executable files that are implemented by the processor 11, and also provides a storage unit for any required data such as dynamic binding data 15. The programs/executable files stored in the memory 12, and implemented by the processor 1, include but are not limited to a packet/message processing unit 16, a mapping unit 17 and a media transport protocol translation unit 18. The packet/message processing unit 16 can be configured to extract dynamic binding data from received H.248 command messages, to store the dynamic binding data in the memory, and to extract a payload type number or codec identifier from a received media transport protocol packet/message. The mapping unit 17 can be configured to map a payload type number obtained from a received media transport protocol packet to a corresponding codec identifier, or a codec identifier obtained from a received media transport protocol packet to a corresponding payload type number. The media transport protocol translation unit 18 can be configured to translate received media transport protocol packets to packets that use a different media transport protocol, and to include either a payload type number or codec identifier provided by the mapping unit into the translated packets.

It will be appreciated by the person of skill in the art that various modifications may be made to the above-described embodiments without departing from the scope of the present invention. For example, whilst the above-described examples relate to the process of implementing an audio session through an IMS, the above-described methods and apparatus could equally be used to implement a video session through the IMS. Furthermore, whilst the above-described examples relate to a scenario in which a first UE implements RTMP and a second UE implements RTP, the methods and apparatus described herein are equally to any scenario in which an endpoint of an IMS session implements an alternative media transport protocol other than RTP. For example, the methods and apparatus described are equally applicable to scenario in which a first UE wants to exchange media with a second UE using an IMS, wherein both the first UE and the second UE implement RTMP.

The invention claimed is:

1. An apparatus configured to operate as an IP Multimedia Subsystem (IMS) Access Gateway (IMS-AGW) and to support transmission of media to and from an endpoint using an IMS, the apparatus comprising:
   a first receiver to receive instructions from an IMS Application Level Gateway (IMS-ALG) for an alternative media transport protocol connection with the endpoint and a Real time Transport Protocol (RTP) connection within the IMS, wherein the endpoint implements an alternative media transport protocol other than RTP, and wherein the instructions include more than one RTP payload type number and a dynamic binding of each of the more than one RTP payload type number to a statically defined codec identifier;
   a memory to store the dynamic binding of each of the more than one RTP payload type number to the statically defined codec identifier;
   a processor to translate between alternative media transport protocol packets carried by the alternative media transport protocol connection and RTP packets carried by the RTP connection, using the stored dynamic binding to map between an RTP payload type number and a codec identifier used by the alternative media transport protocol; and
   a second receiver to receive an alternative media transport protocol packet from the endpoint, wherein the processor translates the alternative media transport protocol packet to an RTP packet, using the stored dynamic binding to map between the codec identifier included in the alternative media transport protocol packet and the RTP payload type number to be included in the RTP packet.

2. The apparatus as claimed in claim 1, wherein the second receiver receives an RTP packet received from the IMS, and wherein the processor translates the RTP packet to an alternative media transport protocol packet, using the stored dynamic binding to map between an RTP payload type number included in the RTP packet and a codec identifier to be included in the alternative media transport protocol packet.

3. The apparatus as claimed in claim 2, wherein the processor: obtains an RTP payload type number from the RTP packet, using the stored dynamic binding to determine a codec identifier associated with a codec identified by the RTP payload type number, generates an alternative media transport protocol packet corresponding to the RTP packet, and includes the determined codec identifier in the alternative media transport protocol packet.

4. The apparatus as claimed in claim 2, further comprising a transmitter to transmit the alternative media transport protocol packet.

5. The apparatus as claimed in claim 1, wherein the processor further: obtains a statically defined codec identifier from the alternative media transport protocol packet, uses the stored dynamic binding to determine an RTP payload type number dynamically allocated to a codec identified by the statically defined codec identifier, generates an RTP packet corresponding to the alternative media transport protocol packet, and includes the determined RTP payload type number in the RTP packet.

6. The apparatus as claimed in claim 1, further comprising a transmitter to transmit the RTP packet.

7. The apparatus as claimed in claim 1, wherein the alternative media transport protocol is Real Time Messaging Protocol (RTMP).

8. A method of operating an IP Multimedia Subsystem (IMS) Access Gateway (IMS-AGW) in order to support transmission of media to and from an endpoint, using an IMS, the method comprising:
   receiving instructions from an IMS Application Level Gateway (IMS-ALG) for an alternative media transport protocol connection with the endpoint and a Real time Transport Protocol (RTP) connection within the IMS, the endpoint implementing an alternative media transport protocol other than RTP, and the instructions including more than one RTP payload type number and a dynamic binding of each of the more than one RTP payload type number to a statically defined codec identifier;
   storing the dynamic binding of each of the more than one RTP payload type number to the statically defined codec identifier;
   when translating between alternative media transport protocol packets carried by the alternative media transport protocol connection and RTP packets carried by the RTP connection, using the stored dynamic binding to map between an RTP payload type number and a codec identifier used by the alternative media transport protocol; and
   for an alternative media transport protocol packet received from the endpoint, translating the alternative media transport protocol packet to an RTP packet, using the stored dynamic binding to map between the codec identifier included in the alternative media transport protocol packet and the RTP payload type number to be included in the RTP packet.

9. The method as claimed in claim 8, further comprising:
   obtaining the codec identifier from the alternative media transport protocol packet, using the stored dynamic binding to determine an RTP payload type number associated with a codec identified by the codec identifier, generating an RTP packet corresponding to the alternative media transport protocol packet, including the determined RTP payload type number in the RTP packet, and transmitting the RTP packet.

10. The method as claimed in claim 8, further comprising:
    for an RTP packet received from the IMS, translating the RTP packet to an alternative media transport protocol packet, using the stored dynamic binding to map between an RTP payload type number included in the RTP packet and a codec identifier to be included in the alternative media transport protocol packet.

11. The method as claimed in claim 8, further comprising:
    obtaining an RTP payload type number from the RTP packet, using the stored dynamic binding to determine a codec identifier associated with a codec identified by the RTP payload type number, generating an alternative media transport protocol packet corresponding to the RTP packet, including the determined codec identifier in the alternative media transport protocol packet, and transmitting the alternative media transport protocol packet.

12. The method as claimed in claim 8, wherein the RTP connection is between the IMS-AGW and any one of:
    a further IMS-AGW;
    an IMS Transition Gateway (TrGW); and
    a Media Gateway.

13. The method as claimed in claim 8, wherein the alternative media transport protocol is Real Time Messaging Protocol (RTMP).

14. A computer program product comprising a non-transitory computer readable medium storing computer program code adapted, when run on a computer, to operate the computer to perform the method of claim 8.

* * * * *